July 14, 1964

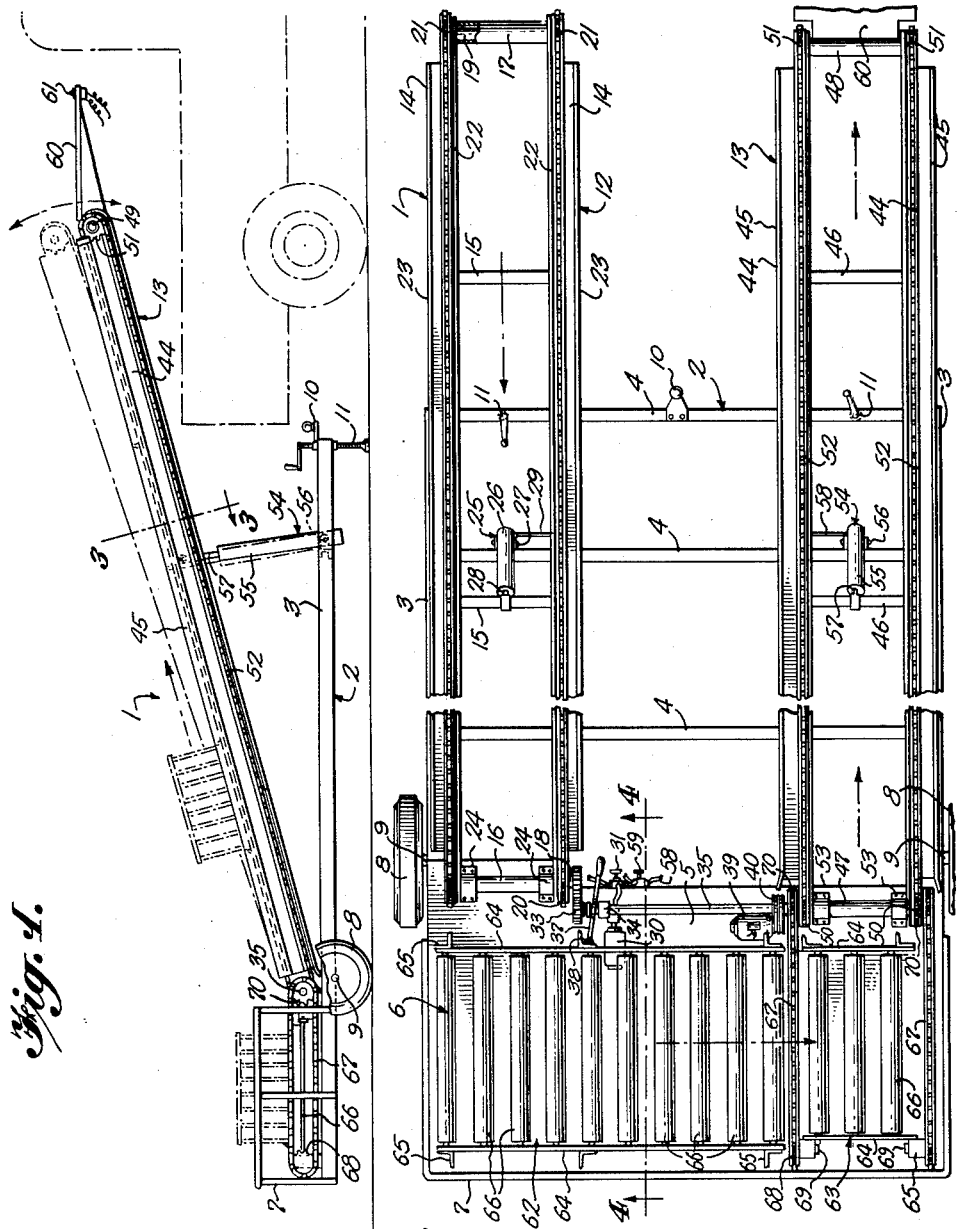

J. L. HERRING ETAL 3,140,770

LOADER

Filed Dec. 11, 1962

INVENTORS
JEROME L. HERRING,
WILLIAM T. GRANT and
B. RAYMOND PISTNER

BY Mason, Fenwick & Lawrence
ATTORNEYS 3,140,770
LOADER
Jerome L. Herring, William T. Grant, and Bernard Raymond Pistner, Rose Hill, N.C., assignors to American Truck Body Company, Martinsville, Va., a corporation of Virginia
Filed Dec. 11, 1962, Ser. No. 243,767
5 Claims. (Cl. 198—7)

This invention relates to loaders generally, and is particularly adapted to loaders for use in unloading and loading poultry coops from and onto trucks.

In shipping poultry, it is customary to place the birds in coops and to load the coops onto trucks for delivery. Empty coops are brought back to the poultryman for reloading. Usually, the truck that brings in the empty coops will take on a load of filled ones. The coops must be taken from the truck, refilled with poultry and reloaded onto the truck. The empty coops must be carried to the growing houses and filled before loading for delivery.

The general object of the present invention is to provide a loader which will make it possible to unload, fill and reload coops as a continuous operation.

A more specific object is to provide a dual conveying mechanism, having conveyor flights operating in opposite directions to move articles to and from a central transfer area at which the articles can be loaded and transferred from one conveyor flight to the other.

Another objects of the invention is the provision in conveying mechanisms of this kind of separate conveyor flights capable of separate vertical angular adjustment while maintaining contiguity with a common transfer area.

A further object is to provide separate controls for the dual conveyor flights, the control for one flight being automatic, and the other manually operated.

Other objects of the invention will become apparent from the following description of one practical embodiment thereof, when taken in conjunction with the drawings which accompany and form part of this specification.

In the drawings:

FIGURE 1 is a side elevation of a loader embodying the principles of the present invention;

FIGURE 2 is a top plan view, on an enlarged scale, of the apparatus shown in FIGURE 1;

Figure 3:
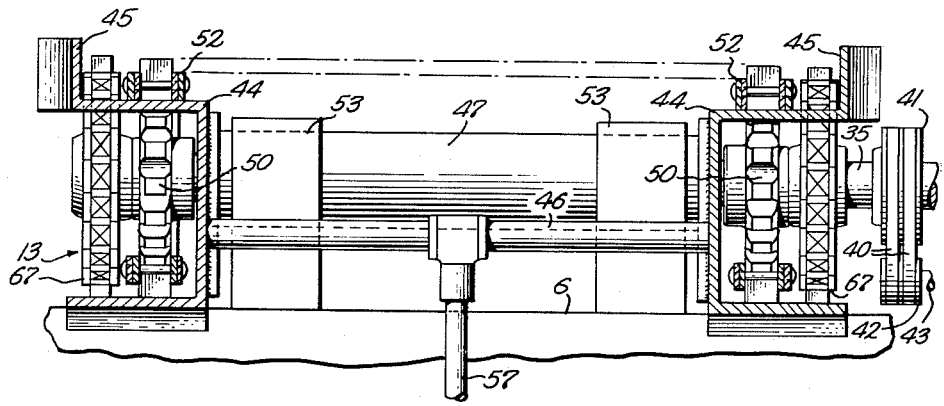
FIGURE 3 is a vertical transverse section, on a still larger scale, and is taken on the line 3—3 of FIGURE 1.
Figure 4:
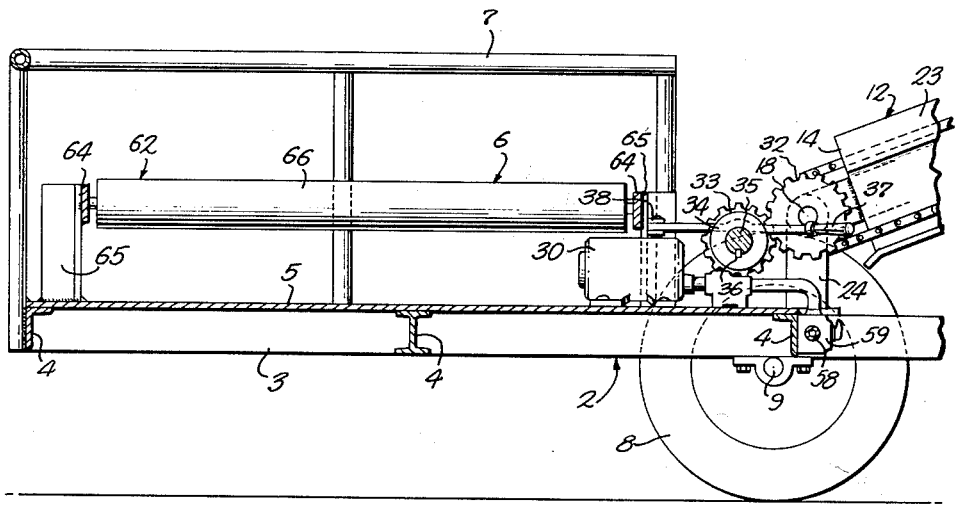
FIGURE 4 is a section through the transfer area, taken on the line 4—4 of FIGURE 2.

In general, the invention concerns a portable loader having parallel, oppositely movable conveyors, hingedly connected to a combination filling and transfer area which will make it possible to unload empty containers from a truck, carry them to the filling and transfer area, and return filled containers to the truck. The conveyors are angularly adjustable in a vertical direction to permit raising and lowering their free ends in accordance with the height from which, or to which, the containers are to be moved. The conveyor operation is separably controllable.

Referring to the drawings in detail, the loader is mounted upon a wheeled frame 2, so that it may be moved freely from place to place. The frame can be a simple one, and is shown as formed by two side rails 3 joined by transverse members 4. A flooring 5, at the rear, provides a transfer platform 6. A rail 7 may be used around the transfer area. Wheels 8 mounted on axles 9, supported on the underside of the frame.

The loader is provided with a hitch 10 by means of which it can be attached to a towing vehicle. Jacks 11 are mounted on the forward transverse frame member to serve as supporting legs for the loader when in use, and means by which the frame can be levelled for use.

Two conveyors, an unloading conveyor 12 and a loading conveyor 13, are pivotally connected along the front edge of the transfer platform. The unloading conveyor has a frame composed of side rails 14 connected by transverse spacers 15. At the ends of the rails, spacer tubes 16 and 17 extend between the rails and house chain shafts 18 and 19. Sprockets 20 and 21 are mounted on the respective shafts and carry conveyor chains 22. The side rails (see FIGURE 3) are channel shaped, with their channels opening outwardly. Side guides 23 project vertically inward from the outer free edges of the top flanges of the side rails. The lower flights of chains 22 ride within the channels of the side rails, while the top flights ride upon the top flanges of the side rails, inside the side guides.

Spacer tube 16 passes through bearing blocks 24 fixed to the platform 6, to pivotally connect the unloading conveyor to the frame. The unloading conveyor is moved about its pivot to selected vertical angles relative to the frame by means of a hydraulic cylinder assembly 25. Cylinder 26 is pivotally connected to one of the transverse members 4 of the frame, as at 27, and the piston rod 28 of the assembly is connected to one of the cross members, or spacers, 15 of the unloader frame. The cylinder is connected by hose 29 to a hydraulic pump 30 which supplies fluid under pressure to operate the cylinder. A valve 31 in line 29 controls the flow of fluid to and from the cylinder.

Shaft 18 is the driven shaft for the unloader chain. It extends beyond the side rail on the inside, and carries a gear 32 which can mesh with a reversing gear 33, mounted on a collar 34 which is slidable along a shaft 35. A key 36 causes the collar to rotate with shaft 35. A lever 37, pivotally connected at 38 to platform 6, shifts the collar along shaft 35, to cause gear 33 to move into and out of mesh with gear 32. A motor 39 mounted on platform 6, drives shaft 35 through belt 40 which passes around pulleys 41 and 42 on shaft 35 and the motor shaft 43, respectively.

The loading conveyor 13 is substantially the same construction as the unloading conveyor 12. It also has side rails 44, with side guides 45, held in spaced relation by intermediate spacers 46, and end spacer tubes 47 and 48. Shaft 35 extends through tube 47 to provide the drive shaft for the loading chains, and a chain shaft 49 extends through tube 48. Shafts 35 and 49 carry sprockets 50 and 51, respectively, and the sprockets have chains 52 trained about them.

Spacer tube 47 is pivoted to the platform 6 by bearing blocks 53 to swingably mount the loading conveyor on the frame. The conveyor is moved about its pivot by hydraulic cylinder assembly 54, having a cylinder 55 connected to the frame at 56 and a piston rod 57 attached to the conveyor spacer. Hose line 58 connects the cylinder to a control valve 59 which, in turn, is connected to the pump 30. Valves 31 and 59 are arranged side-by-side so that they may be operated separately or together.

Loading conveyor 13 carries a delivery platform 60 at its free end, onto which containers are deposited by the chains 52. The platform has a switch 61, which is contacted by containers to stop motor 39. As soon as a container is moved from the platform, the motor will restart.

The transfer area bridges the space between the two conveyors 12 and 13, and is arranged so that containers will be delivered to it by conveyor 12 and removed from it by conveyor 13. The area contains two sections 62 and 63 of lateral transfer means. The sections each have side frames 64, supported on legs 65 from the platform 6. Rollers 66 extend between the side frame and are journalled in them. The rollers are freely movable to provide a rolling support for containers delivered by conveyor 12.

Pickup chains 67 extend along the sides of the lateral transfer section 63 to move containers deposited on the rollers of the section 63 onto the loader conveyor. The chains pass around sprockets 68 on stub shafts 69, and sprockets 70 on shaft 35. Shaft 35 provides the drive for chains 67 in the same direction as chains 52. The pickup chains are aligned with, and form a part of, the container loading paths.

If the loader is to be used in the handling of poultry coops, for example, the loader may be hauled behind a truck loaded with empty coops directly to a poultry growing house. On arrival, the loader may be backed into the doorway of the house so that the transfer platform is at the catching area. The loader will be uncoupled from the towing truck and set up upon the jacks 11. The jacks can be rotated to bring the loader frame into a substantially horizontal position. Motor 39 and pump 30 will be connected to a suitable electric force source. By actuation of valves 31 and 59, the conveyors 12 and 13 can be adjusted to the desired angle to have their free ends overlie the truck body. The loader chains 52 and the pickup chains 67 will start operating as soon as the motor is started. Unloader chain 22 will be started by shifting lever 37 to bring gear 33 into mesh with gear 32. When this is done, all parts of the apparatus will be in operation.

An attendant, positioned in the truck, will place empty coops upon the free end of the unloading conveyor 12. The coops will rest upon the chains 22 and will be between the side guides 23 so that they cannot fall from the side of the conveyor. Coops will move with chains 22 down the length of the unloader and be deposited upon the section 62 of the lateral transfer means. A second attendant, stationed within the grower house, will catch birds and fill the coops. As they are filled, they will be pushed over the rollers of the transfer section 62 onto the section 63. Here they will be engaged by the pickup chains 67 and carried forward onto chains 52 of the loading conveyor 13. The filled coops will be moved up the conveyor and deposited on the delivery platform 60. If a coop is not removed when it reaches the delivery platform, but is pushed over the platform to strike switch 61, the motor 39 will stop and all movement of the conveyors will stop. As soon as the coop is moved from the switch the motor will restart and the conveyors will begin movement. If the empty coops are being moved to the transfer area faster than they can be filled, the lever 37 may be moved to disengage gears 32 and 33 and stop the unloading conveyor. As soon as the attendants catch up with the coop supply, the gears can be re-engaged to start the conveyor.

It will be evident that when loading at one growing house is completed, the loader can be moved quickly to the next house and set up for operation. As the operation of the apparatus is both automatically and manually controlled, operating conditions can be maintained which will be suitable to the requirements of the particular job at hand.

While in the above one practical embodiment of the invention has been disclosed, it will be understood that the details of structure shown and described are merely by way of illustrations, and the invention can take other forms within the scope of the appended claims.

What is claimed is:

1. A loader comprising, a wheeled frame, a transfer plaftorm carried by the frame, an unloading conveyor and a loading conveyor pivotally connected at their ends to the transfer platform to project from the platform in spaced parallel relation, means interposed between the frame and each of said conveyors to move the conveyors vertically about their pivotal connections, means to drive the unloading conveyor in a direction to deliver articles to the transfer platform, means on the transfer platform adjacent the end of the loading conveyor to pick up articles and deliver them to the loading conveyor, means to drive the pickup means and the loading conveyor to move articles on the loading conveyor away from the transfer platform.

2. A loader as claimed in claim 1 wherein there are manually controlled means to disconnect the unloading conveyor from the unloading conveyor drive means.

3. A loader as claimed in claim 2 wherein, the end of the loading conveyor remote from the pivotal connection with the transfer platform carries a delivery platform, and means on the delivery platform operable by contact of an article on the delivery platform to stop the operation of the drive means for the said conveyors.

4. A loader as claimed in claim 1 wherein, the means to move the conveyors vertically about their pivotal connections include control means for independent operation of the respective conveyors.

5. A loader as claimed in claim 1 wherein, the transfer platform carries anti-friction means upon which articles delivered by the unloading conveyor will be deposited, the anti-friction means extending across the transfer platform to the pickup means to facilitate movement of articles across the transfer platform.

References Cited in the file of this patent

UNITED STATES PATENTS

| | | |
|---|---|---|
| 1,132,840 | Garrett | Mar. 23, 1915 |
| 1,213,077 | Coelier | Jan. 16, 1917 |
| 2,762,487 | Temple | Sept. 11, 1946 |
| 3,051,289 | Horsford | Aug. 28, 1962 |